United States Patent [19]

Stone

[11] 4,027,859
[45] June 7, 1977

[54] AUTOMATIC CONTROL OF LIQUID ADDITION TO A MIXTURE BY POWER SENSING

[75] Inventor: Milton Stone, Chicago, Ill.

[73] Assignee: Pettibone Corporation, Chicago, Ill.

[22] Filed: May 25, 1976

[21] Appl. No.: 689,873

[52] U.S. Cl. .................................. 259/18; 259/168
[51] Int. Cl.² ........................................ B01F 15/02
[58] Field of Search .......... 259/191, 192, 193, 194, 259/154, 149, 168, 164, 5, 6, 7, 8, 9, 10, 21, 22, 23, 24, 25, 26, 18, 165; 137/88, 90, 92, 93

[56] References Cited
UNITED STATES PATENTS

| | | | |
|---|---|---|---|
| 2,954,215 | 9/1960 | Warmkessel | 259/154 |
| 3,249,970 | 5/1966 | Hartley | 259/154 |
| 3,601,373 | 8/1971 | Hartley | 137/88 |
| 3,825,235 | 7/1974 | Schwertferger | 259/191 |
| 3,888,470 | 6/1975 | Leisenberg | 259/191 |

Primary Examiner—Robert W. Jenkins
Attorney, Agent, or Firm—Frank B. Hall

[57] ABSTRACT

An apparatus for adding trim water or liquid to a mixture in a powered mixer and controlling the amount automatically. After a selected temperature has been signalled by a temperature sensing device, the water or liquid is pulsed into the mixer, each pulse being followed by a dispersion time, until a selected power level is detected by a power sensing device, the selected power level having previously been correlated through testing with a desired characteristic of the mixture. When the selected power level is detected, a signal from the power sensing device terminates the water or liquid addition.

13 Claims, 5 Drawing Figures

OPERATION OF PULSING TIMER

AUTOMATIC CONTROL OF LIQUID ADDITION TO A MIXTURE BY POWER SENSING

BACKGROUND OF THE INVENTION

The advantages of this invention are particularly evident and the explanation of its operation is facilitated when the invention is applied to the process of mixing paste for the grids of electric batteries, where it serves the purpose of automatically adding sufficient trim water to reach the desired plasticity. Briefly the process consists of an initial mixing of measured amounts of dry lead oxide, additives such as flock and sometimes expanders, and water, followed by a controlled admission of sulfuric acid with cooling air and water cooled mixer walls helping to keep the temperaure below, usually, 155° F. Because water is lost through vaporization during the process, it is difficult to add exactly enough water initially so that the residual water is adequate for the final plasticity desired. Therefore after cooling it is usually necessary to "trim" the mixture with a small amount of additional water. The kind of intensive mixer to which this control has been applied is described in U.S. Pat. No. 3,980,282, entitled "Material Mixing Apparatus," and issued Sep. 14, 1976.

With the exception of the addition of the trim water, it has been possible to automate the process with conventional controls, weighing, measuring, charging, and timing the materials and actuating the necessary machine movements, all without the necessity of an operator being present. However, because there was no automatic control of trim water, this part of the process required the presence of an operator. In addition, as is characteristic of all repetitive manual operations, the success of the correct addition of trim water without overshooting and the time required to trim varies from operator to operator. Through utilization of this invention to add automatically the trim water needed, the complete cycle can now be run without the presence of an operator which was heretofore not possible, an obvious and substantial improvement.

SUMMARY OF THE INVENTION

As applied to the process of mixing battery paste in an electrically driven mixer, the automatic control of this invention is initiated after the admission of sulfuric acid. A temperature actuated switch pre-set to operate at the selected temperature enables the remainder of the circuit when the selected temperature is reached. After the temperature switch enables the circuit, controlled pulses of water are admitted to the mixture by repetitively opening and closing a solenoid water valve, the duration of the time open and the time closed being adjustable. Thus each controlled pulse of water is followed by a dispersion time. An electric meter capable of sensing and indicating the power taken by the electric motor driving the mixer and also capable of being adjusted to produce an electric signal at a desired level of power, is used for determining when sufficient water has been added. Through preliminary testing of samples of the mixture for plasticity and correlating the results with the meter reading at the time the sample is taken, a power level is selected that correlates with the desired plasticity and the meter is adjusted to give its signal when that power level is reached. The pulsing of the water continues until the selected power level is reached, at which time the meter signal causes the water flow to stop and signal the end of the sequence. Should the amount of trim water required be too great for rapid admission by small pulses, a similar action can be initiated with longer pulses by utilizing a second power level signal on the meter. With two adjustable power level signals it is thus possible to reach the final amount of trim water by coarse pulsing of water until one power level is reached and then with finer pulses until the other power level is reached, somewhat analogous to coarse feed and dribble feed in loading a scale precisely.

EXPLANATION OF THE SYMBOLS AND NUMBERING

Figure 2:
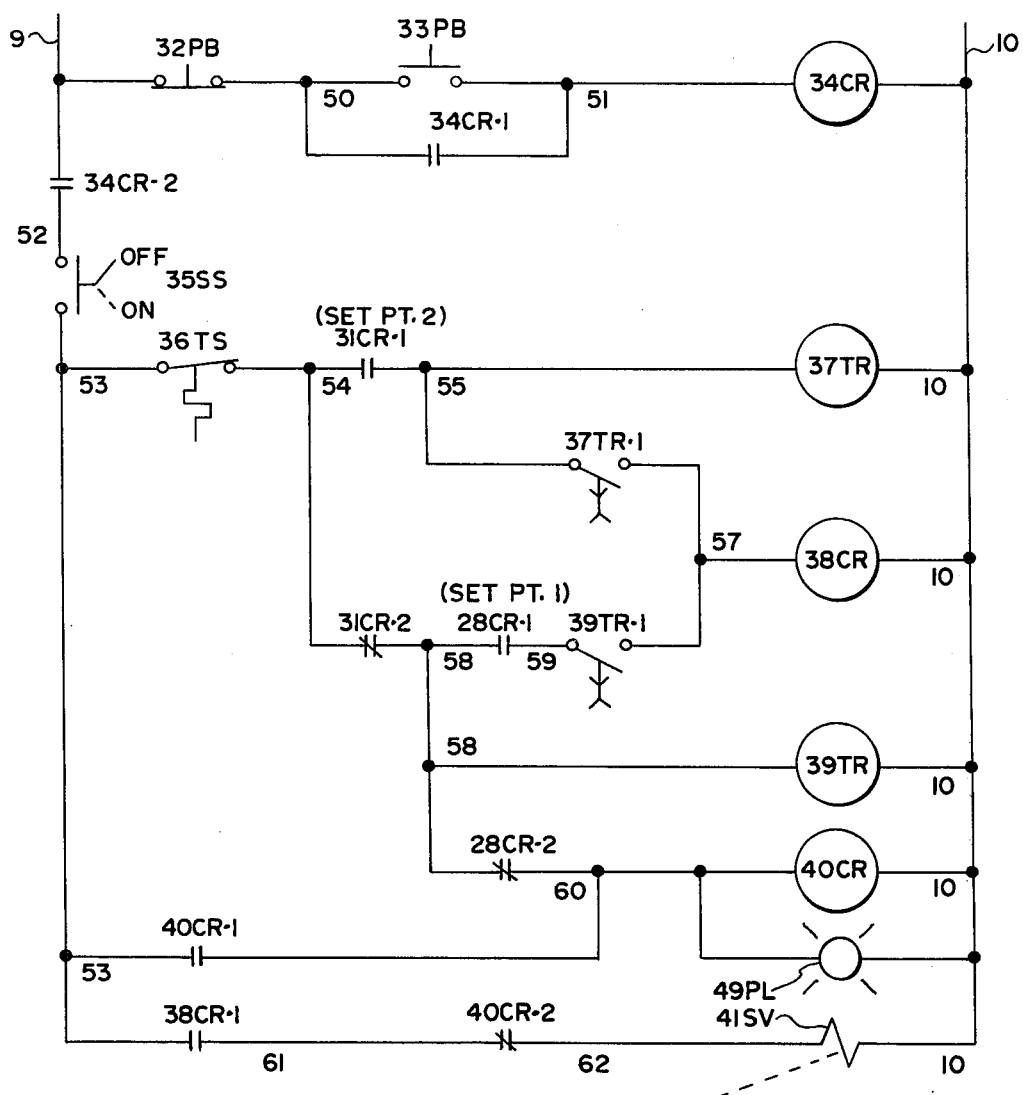
FIG. 2 is a diagram of the electrical circuit of the invention.

Circuits illustrative of the invention are presented in ladder or across-the-line form. The symbols chosen are those of the Joint Industrial Council Standards (JIC) which are in general use in the industrial control field, and which are therefore appropriate for this invention. A relay coil is shown by a circle and the relay contacts are located where they function in the circuit, without regard for their physical location as an actual part of the relay. The relay coil is identified by a number followed by the letters "CR," the identification being placed within the circle. Example: "34CR." The contacts are identified by the identification of the relay coil followed by a number indicating the number of that contact on that relay. Example: "34CR-1" and "34CR-2." The identification of each contact is placed directly over the contact symbol of the circuit. Two parallel lines represent a normally open contact, that is a contact that is open when the relay coil is de-energized. Two parallel lines crossed by a diagonal line represent a normally closed contact. The circle used for a relay coil is also used as a simplified symbol for the pulsing timer, which is then identified by a number followed by the letters "TR." The contacts of that timer are identified by the timer identification with the usual suffix number. Example: "37TR-1." A pilot light is designated as a circle with four rays about it and the identification is a number followed by the letters "PL." The coil of a solenoid valve is identified by a number followed by the letters "SV." Valve symbols are also JIC. All conductors having common electrical continuity have the same number. When an electrical device is connected between two conductors, the conductors no longer have common continuity and are therefore numbered differently. In FIG. 2, numbers 9, 10, and 50 through 62 identify conductors and are placed next to the conductors they identify.

DESCRIPTION OF THE PREFERRED EMBODIMENT

Figure 1:
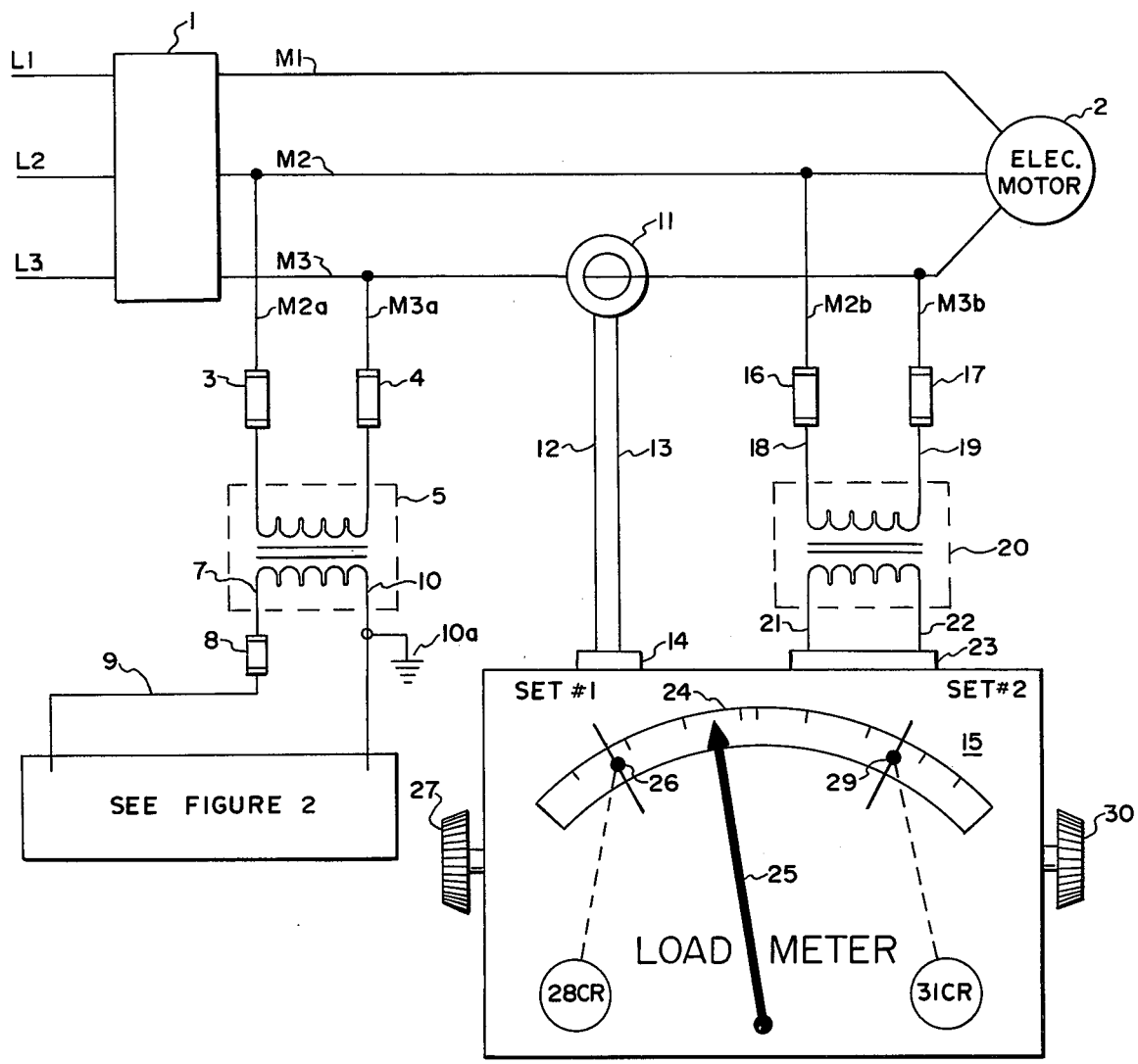
FIG. 1 is a diagram of the electrical power lines to the electric motor driving the mixer, the connections to the potential and current transformers and load meter, and the connection of a control transformer to provide control voltage for the automatic control circuit, according to this invention.

The circuit of this invention as applied to the automatic control of trim water in the process of mixing battery paste in an intensive mixer is presented as a preferred embodiment of the invention. Most such industrial appplications involve a mixer driven by a three phase induction electric motor. In FIG. 1 the three-phase conductors are shown as L1, L2, and L3. A conventional controller 1 with its associated controls connects or disconnects the three-phase conductors to conductors M1, M2, and M3 respectively. The electric motor 2 is the motor that drives the mixer and thus is the motor whose power is monitored. The control circuit voltage is nominally 115 volts and is derived ordinarily from the power conductors by means of a control transformer 5. The primary coil of transformer 5 is connected to power conductor M2 through conductor M2a and fuse 3 and to power conductor M3 through conductor M3a and fuse 4. The secondary voltage of 115 volts then appears across the secondary winding of transformer 5 between conductors 7 and 10. Conductor 10 is connected to ground 10a. Conductor 7 is connected through a fuse 8 to conductor 9. When M2 and M3 power conductors are energized through controller 1, 115 volts appears between conductor 9 and conductor 10. The automatic control circuit appears in FIG. 2 and will be discussed in detail.

A commercially available dynamometer type instrument, a wattmeter, referred to hereafter as a load meter 15, requires for its operation a current connection and a potential connection to the power conductors. The current connections is provided by a current coil 1 on power conductor M3, which is connected through conductors 12 and 13 to the current input 14 for the load meter 15. The potential connection is accomplished by a potential transformer 20, one side of whose primary winding is connected from power conductor M2 through M2b, fuse 16, and conductor 18. The other side of the primary winding is connectd through conductor 19, fuse 17, and conductor M3b to power conductor M3. The secondary winding of potential transformer 20 is connected through conductors 21 and 22 to the potential input 23 of the load meter 15.

Operation of the load meter. In the following discussion the contacts 28CR-1, 28CR-2, 31CR-1 and 31CR-2 are shown in FIG. 2, but the relay coils 28CR and 31CR are shown in FIG. 1 as part of the load meter 15. When the load meter is energized and the indicator 25 is above (to the right of) the lower set point 26, relay 28CR is energized. Contacts 28CR-1 are therefore closed and contacts 28CR-2 are open. The status of the contacts reverses when the indicator 25 is below (to the left of) the set point 26. Relay 28CR is then de-energized. When the load meter is energized and indicator 25 is above the upper set point 29, relay 31CR is energized. Contacts 31CR-1 are therefore closed and contacts 31CR-2 are open. The status of the contacts reverses when indicator 25 is below the set point 29, which de-energizes relay 31CR. Set point 26 is manually adjustable by knob 27, and set point 29 is manually adjustable by knob 30.

Figure 3:
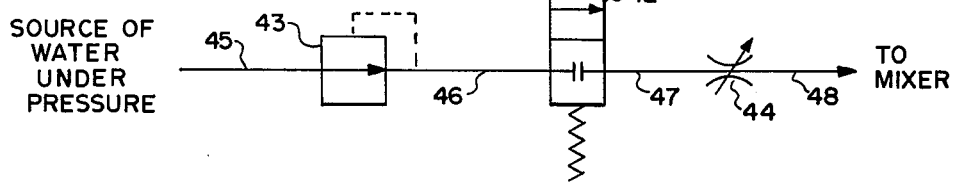
FIG. 3 is a diagram of the valves for admission of water to the mixer according to the invention.

Operation of the water circuit. Now consider FIG. 3. From a source of water under pressure, a pipe 45 connects to a pressure reducing valve 43 set below the pressure of the source. The flow out of the valve 43 is through pipe 46 to the normally-closed, two-way, two-positioned, single solenoid, spring return valve 42. Valve 42 is connected through pipe 47 to the adjustable flow control valve 44. From the flow control valve 44, the water flows through pipe 48 to the mixer. With the water source at a higher pressure than the pressure reducing valve 43 setting the water is maintained at a constant pressure despite fluctuations in the pressure of the water source as long as the lowest pressure is still above the setting of valve 43. Because of this flow control valve 44 need not be pressure compensated. By throttling down the flow control valve 44, the flow is less and therefore can be more precisely measured by time. Water flows into the mixer only so long as the solenoid valve 42 is open.

Figure 4:
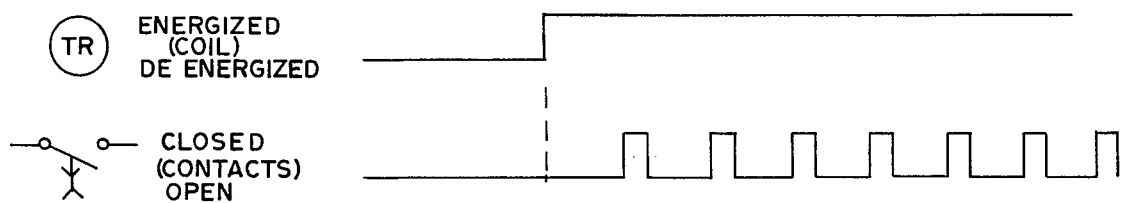
FIG. 4 is an operation chart showing the action of the pulsing timer used in this embodiment of the invention.

Operation of the pulsing timers. Represented in the circuit of FIG. 2 are two pulsing timers which are commercial units, 37TR and 39TR. They are actually transistorized units, but are represented in simplified symbols as timing relays. The operation of the pulsing timers is shown in FIG. 4. A comparison of the timing charts will show the action when the "coil" of the timer is energized and when it is de-energized.

Operation of the control circuit. FIG. 2. As explained earlier the control transformer 5 provides a 115 volt potential between conductors 9 and 10. A pushbutton 33PB energizes 34CR when depressed. Contacts 34CR.1 close between conductors 50 and 51, keeping relay 34CR energized when 33PB is released. The relay 34CR remains energized in this way unless there is a voltage failure or until pushbutton 32PB is depressed momentarily interrupting continuity between conductor 9 and 50, and de-energizing 34CR. Once 33PB is depressed, and 34CR is energized, conductor 9 is connected to conductor 52 through contact 34CR.2, and therefore a 115 volt potential exists between conductor 52 and conductor 10. Ordinarily after the sulfuric acid is added, a signal from the conventional controls on the earlier part of the sequence can be automatically provided to start the trim water control. However, for the sake of explantation, a manual OFF-ON selector switch 35SS is shown instead of an automatically closed set of contact. The automatic control of trim water is initiated by operating switch 35SS to the closed position. This provides continuity from conductor 52 to conductor 53, and a 115 volt potential between conductor 53 and 10. Testing for paste characteristics is ordinarily done at a temperature between 100° and 110° F, and whatever setting is chosen for the tests is set on the temperature actuated switch. Above the selected temperature, the temperature actuated switch 36TS remains open and no trim water is admitted. When the temperature has been reduced below this value, the switch 36TS closes, connecting conductor 53 and 54. Assume that the load meter indicator 25 is above the upper set point (set pt. 2) 29, relays 28CR and 31CR are both energized. Because contacts 31CR-1 close, there is now continuity from 53 through 54 to 55, and the coil of 37TR is energized. The contacts 37TR-1 will now operate open and closed between conductors 55 and 57 as shown in FIG. 4. Relay 38CR will be alternately de-energized and energized. Contacts 38CR-1 will alternately open and close between conductor 53 and 61, and the coil 41SV of the solenoid valve 42 will be alternately de-energized and energized through the path consisting of conductor 53, contact 38CR-1, conductor 61, contacts 40CR-2, and conductor 62. The solenoid valve 42 will follow the action by closing and opening in response to the solenoid 41SV. When the effect of the water admitted to the mixture cause a reduction in the power taken by the electric motor 2 to mix the materials, the reduction will eventually cause the indicator 25 to move below the upper set point (set pt. 2) 29. When this occurs relay 31CR is de-energized and contacts 31CR-1 open between conductors 54 and 55, de-energizing timer 37TR and relay 38CR. However, relay 28CR is still energized with contacts 28CR-2 open between conductors 58 and 60, thus preventing the energization of relay 40CR. Contacts 28CR-1 are closed between conductors 58 and 59. Because 31CR is now de-energized, contacts 31CR-2 are now closed between conductors 54 and 58, and the coil 39TR is energized causing the contacts 39TR-1 to alternately open and close between conductor 59 and conductor 57, in an action as shown in FIG. 4. As a result relay 38CR will be again alternately de-energized and energized, but now through the conductor 53, contacts 36TS, conductor 54, contacts 31CR-2, conductor 58, contacts 28CR-1, conductor 59, pulsing contacts 39TR-1, and conductor 57. Solenoid 41SV and solenoid valve 42 will respond to this new energizing of relay 38CR as they did to the previous energizing. However, in the former case the pulsing was controlled by timer 37TR and now the pulsing is controlled by timer 39TR. When the final set point (set pt. 1) 26 is reached by indicator 25, relay 28CR is de-energized. Contacts 28CR-1 open between conductors 58 and 59, de-energizing relay 38CR. Contacts 28CR-2 close between conductors 58 and 60, energizing relay 40CR and pilot light 49PL. Contacts 40CR-1 close between conductors 53 and 60, maintaining relay 40CR energized. Contacts 40CR-2 open between conductors 61 and 62, preventing the further energization of solenoid 41SV and stopping the pulsing of water. The mixture is now at the desired plasticity. Selector switch 35SS is opened between conductors 52 and 53 to disable the circuit until the next cycle. It should be repeated here that in a fully automated process, the contact 35SS would be automatically opened or closed at the proper time by the preceding sequence and would undoubtedly be a relay contact.

It should be noted that there is no real need to determine the actual power by means of the load meter. It is only necessary that for a given power, that the indicator of the load meter show the same indication. Should the electrical power system be unbalanced in any way, the reading of a single wattmeter load meter as shown in this specification would differ from its reading under the same load conditions but with a balanced electrical system. Again, however, if the conditions remain the same balanced or unbalanced, the reading will repeat for the same load. If electrical conditions change frequently because of other intermittent loading of the electric system however, a two-wattmeter load meter can be utilized to maintain the repeatability of the readings.

It will be understood of course that the amount of the mixture must be substantially constant from batch to batch. Obviously if all additions of materials were halved, the electric power required by the mixer motor would be greatly altered, and the load meter set points determined for a full load would be meaningless.

Other factors influence the load of course, such as wear on the machine or a bearing gradually failing and thus producing more friction on the drive. Here too repeatability is the key to the success of the control. Unless there is a sudden change which would reveal itself in the sudden appearance of bad batches, the change will be gradual. With periodic testing, the load meter set point can be gradually adjusted over a series of batches to maintain the mixture in the desired range.

Although the control is shown with an upper and a lower set point, the upper set point can usually be eliminated if the original addition of water is estimated correctly. That is, if the original amount of water is sufficient to bring the mixture below the upper set point each time, obviously there is no need to have the upper set point at all.

In this invention it is critical to have the meter response damped, or if it is not damped, to interpose an integrating relay between the load meter relay and the control circuit, or to obtain a load meter with a commercial modification in which the load relays 28CR and 31CR respond on an integrating basis to fluctuations of the indicator 25 around the set points. It is preferable to have both the mechanical damping of the needle indicator 25 so that the reading can be visually made without too much vibration of the needle indicator, and the internal electrical or electronic damping of the set point relays. The load meters are commercially available with the mechanical damping of the indicator movement by means of silica gel on the movement bearing.

Although the invention has been described in its application to the mixing of lead oxide battery paste, it can obviously be used in any process in which the addition of liquid causes a change in the viscosity of the mixture of a magnitude sufficient to cause the required detectable change in power required to mix it. For convenience such a mixture is defined as a mixture having a liquid-dependent-viscosity.

The invention recognized the importance of temperature upon such liquid-dependent-viscosity mixtures, and the fact that it is important to reduce the temperature of the mixture before attempting to correlate the load level with the amount of liquid needed.

Further, whether the addition of a liquid affects the viscosity of a mixture by increasing or decreasing the viscosity, the control is applicable. The mixing of lead oxide battery paste presents the case of a viscosity that decreases as trim water is added. If the addition of liquid to a mixture causes an increase in viscosity, the control is modified simply by interchanging the function of the upper and lower set points, and interchanging the normally open contacts with the normally closed contacts of the load meter relays.

The term "enable" is used in the usual control sense as meaning a condition or status that must be present before that which is "enabled" can function. The term "disable" similarly is used to denote a condition or status that prevents another function from occurring although all the other conditions for that function obtain.

Neglecting phase angle, electric power is a function of current and voltage. In a similar way hydraulic power is a function of flow and pressure. Because hydraulic power is often considered as a practical substitute for electric power in a machine drive, the application of this invention to a hydraulic drive requires only a means of sensing the hydraulic power and of providing a set point signal. Also, instruments are available for either electrical operation or pneumatic operation, and the ease of using one medium of power or control or another, or of combining the media of electric, hydraulic, or pneumatic, is facilitated by the many commercial options available. The use of transducers from one medium to another is well understood in the art.

Figure 5:
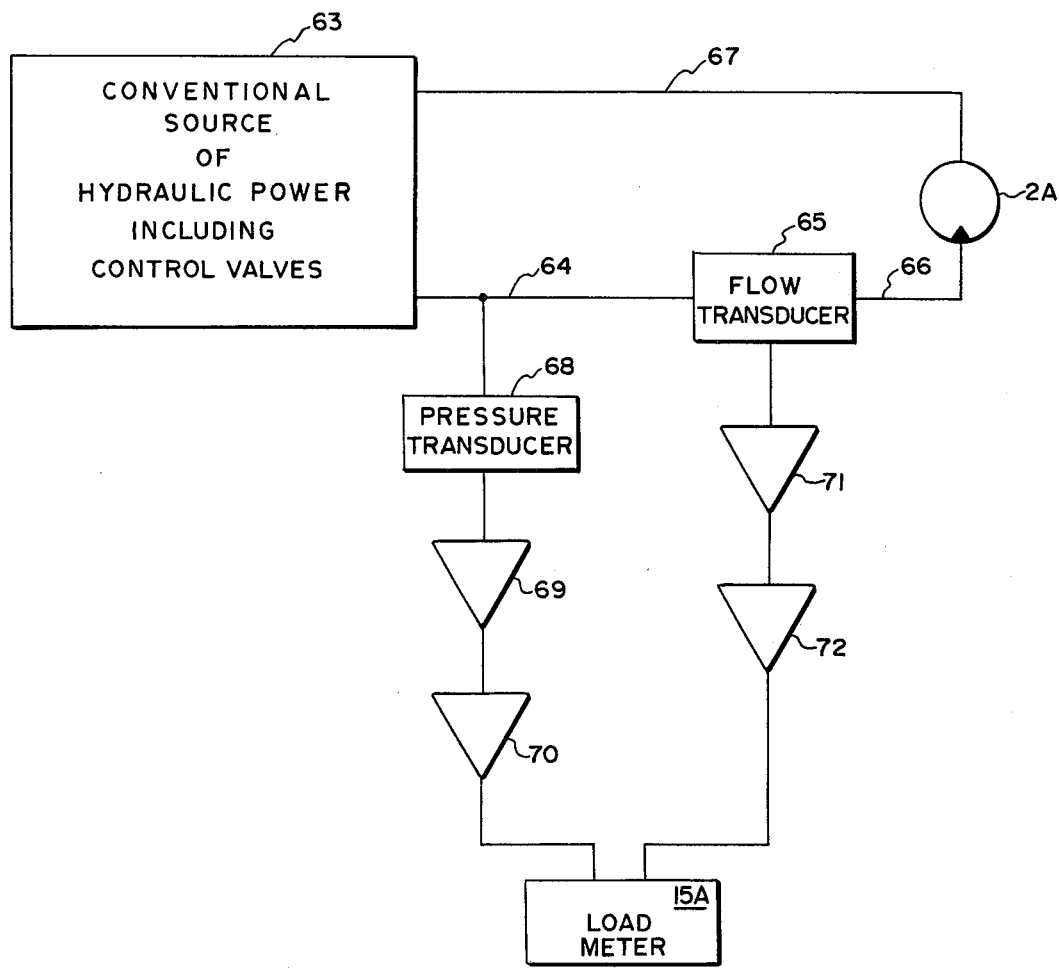
FIG. 5 is a schematic representation of power sensing according to the invention when the power drive is a hydraulic motor rather than an electric motor.

FIG. 5 is a representation of an application of the invention to a hydraulic drive. In this case a conventional source of hydraulic power including control valves 63 provides pressure and flow through line 64 through flow transducer 65 and line 66 to a hydraulic motor 2A, the return line being 67. Pressure transducer 68 is connected to pressure line 64. The hydraulic pressure is transformed into an electric signal which is then amplified by amplifier 69 and amplifier 70. The flow rate is converted into an electric signal by transducer 65, which is then amplified by amplifier 71 and amplifier 72. The outputs of amplifiers 70 and 72 are then supplied to load meter 15A which indicates the resultant product of the two signals. The hydraulic motor 2A performs the identical drive function as the electric drive motor 2, and is distinguished therefore only by the addition of the suffix A. The load meter 15A performs the identical function and can in fact with appropriate choices of amplifiers be the same instrument as load meter 15, and is therefore distinguished only by the addition of the suffix A. Just as response of load meter 15 is to the resultant product of voltage and current, so the response of load meter 15A is, through transducers and amplifiers, to the resultant product of pressure and flow representing hydraulic power. Amplifiers and transducers are conventional components.

Thus although the invention has been described with reference to a preferred embodiment applied to an electric drive, it is equally applicable to a hydraulic drive. It is obvious that equivalent alterations, modifications, and applications to other processes will occur to others skilled in the art upon the reading and understanding of this specification. The present application includes the application to a hydraulic drive, and all such equivalent alterations, modifications, and applications, and is limited only by the scope of the claims.

Having thus described my invention, I claim:

1. In the process of mixing the materials of a liquid-dependent-viscosity mixture and said liquid in a mixing machine powered electrically, the improvement of automatically controlling the trim liquid, comprising:
    a. means for sensing the temperature of said mixture, and for signalling at a selected temperature,
    b. initiating means for enabling said temperature means signal,
    c. means responsive to said temperature means signal when enabled by said initiating means, for producing a pulsing signal,
    d. means for supplying liquid under pressure to the mixing machine when enabled,
    e. means for enabling said liquid means in a pulsing manner in response to said pulsing signal,
    f. means for sensing the electric power taken by said machine and for signalling at a selected power level, and
    g. means responsive to said power sensing means signal to disable said liquid control means, whereby the admission of liquid is terminated.

2. The improvement of claim 1 in which the power sensing means includes a scale and an indicator for visual display of the power level, and also includes an adjustable means for selection of the power level on said scale at which the signal will occur.

3. The improvement of claim 2 in which the power sensing means includes damping means for said indicator.

4. The improvement of claim 2 in which the power sensing means includes damping means for the response of the power sensing means signal to occurrence of said selected power level.

5. In the mixing of materials including water for such processes as the mixing of lead oxide battery paste and in which the materials are mixed in a powered mixing machine, an apparatus for automatically controlling the addition of trim water, comprising:
    a. means for sensing the temperature of said mixture, and for signalling at a selected temperature, whereby the automatic addition of trim water is permitted only in a selected temperature range,
    b. initiating means for enabling said temperature means signal,
    c. means responsive to said temperature means signal when enabled by said initiating means, for producing a pulsing signal,
    d. means for supplying water under pressure to said mixing machine when enabled,
    e. means for enabling said water supply means in a pulsing manner in response to said pulsing signal, whereby each pulsed admission of water is followed by an interval permitting dispersion before the next pulse of water,
    f. means for sensing the power taken by said machine and for providing a signal at a selected power level, and
    g. means responsive to said power sensing means signal to disable said means for enabling water supply means, whereby the admission of trim water is terminated.

6. The apparatus of claim 5 in which said apparatus is adapted for use with a powered mixing machine in which said power means is electric, and in which said power sensing means includes means for sensing current and voltage.

7. The apparatus of claim 6 in which said power sensing means includes a scale and indicator for visual display of the power level, and also includes an adjustable means for selecting the power level on said scale at which said signal will occur.

8. The apparatus of claim 7 in which the power sensing means includes means for damping the response of said power level signal to the occurrence of said selected power level.

9. The apparatus of claim 8 in which said water supply means includes a flow control valve, in which said water supply enabling means includes a solenoid valve, and in which said pulsing signal means includes means for separately adjusting the on and off time durations of the pulsing signal.

10. The apparatus of claim 5 in which the apparatus is adapted for use with a powered mixing machine in which the power is hydraulic, and in which the power sensing means includes means for sensing hydraulic flow and pressure.

11. The apparatus of claim 10 in which said power sensing means includes a scale and indicator for visual display of the power level, and also includes an adjustable means for selecting the power level on said scale at which said signal will occur.

12. The apparatus of claim 11 in which said power sensing means includes means for damping the response of said power level signal to the occurrence of said selected power level.

13. The apparatus of claim 12 in which said water supply means includes a flow control valve, in which said water supply enabling means includes a solenoid valve, and in which said pulsing signal means includes means for separately adjusting the on and off time durations of the pulsating signal.

* * * * *